United States Patent
Bonato et al.

(10) Patent No.: US 6,583,905 B1
(45) Date of Patent: Jun. 24, 2003

(54) APPARATUS AND METHOD FOR REDUCING SPM/GVD IN OPTICAL SYSTEMS

(75) Inventors: Gainluca Bonato, Vercelli (IT); Mauro Macchi, Gorla Maggiore (IT); Paolo Ottolenghi, Sceaux (FR)

(73) Assignee: Cisco Photonics Italy S.r.L., Milan (IT)

(*) Notice: Subject to any disclaimer, the term of this patent is extended or adjusted under 35 U.S.C. 154(b) by 0 days.

(21) Appl. No.: 09/315,265

(22) Filed: May 20, 1999

Related U.S. Application Data
(60) Provisional application No. 60/088,445, filed on Jun. 5, 1998.

(30) Foreign Application Priority Data

May 30, 1998 (EP) .............................................. 98109947

(51) Int. Cl.[7] .............................................. H04B 10/00
(52) U.S. Cl. ...................... 359/161; 359/173; 359/179; 359/158; 359/180; 359/183; 359/184; 359/189; 359/176; 359/124; 359/154
(58) Field of Search ................................. 359/161, 173, 359/158, 179, 124, 154, 180, 183, 184, 181, 189, 176

(56) References Cited

U.S. PATENT DOCUMENTS

| | | | |
|---|---|---|---|
| 5,267,073 A | | 11/1993 | Tamburello et al. |
| 5,483,372 A | * | 1/1996 | Green, Jr. .................... 359/173 |
| 5,504,609 A | | 4/1996 | Alexander et al. |
| 5,539,563 A | | 7/1996 | Park |
| 5,784,184 A | * | 7/1998 | Alexander et al. ........... 359/125 |
| 5,909,297 A | * | 6/1999 | Ishikawa et al. ............. 359/161 |
| 5,938,309 A | * | 8/1999 | Taylor ......................... 359/124 |
| 6,064,507 A | * | 5/2000 | Heflinger et al. ........... 359/189 |
| 6,081,359 A | * | 6/2000 | Takehana et al. ............ 359/133 |
| 6,101,011 A | * | 8/2000 | Taylor ......................... 359/124 |

FOREIGN PATENT DOCUMENTS

| | | |
|---|---|---|
| EP | 0 579 401 | 1/1994 |
| EP | 0 685 947 | 12/1995 |

OTHER PUBLICATIONS

M. Schiess et al., "Pulse Shape Evolution and Noise Estimates in Concatenated Fiber Links Using Analog Optoelectronical Repeaters", Journal of Lightwave Technology, vol. 14, No. 7, pp. 1621–1629 (1996).

(List continued on next page.)

Primary Examiner—Leslie Pascal
Assistant Examiner—Hanh Phan
(74) Attorney, Agent, or Firm—Oblon, Spivak, McClelland, Maier & Neustadt, P.C.

(57) ABSTRACT

An optical transmission system and method for reducing non-linear distortion caused by the interaction of Self-Phase Modulation and Group Velocity Dispersion is disclosed. An optical link includes a transmitter for providing signals at a first optical wavelength, a transponder for converting the first optical wavelength to a second optical wavelength, a plurality of spans of optical transmission fiber and optical fiber amplifiers, a dispersion compensating device, and a receiver. The system operates at a relatively high input power level. The transponder includes a device for smoothing edges of the rise and fall times of optical pulses, such as an electrical attenuator and low pass filter, so that sharp-edged pulses received from the transmitter are transformed to a Gaussian shape. A dispersion compensating device, such as an optical fiber grating, also helps to improve the bit error rate as a function of receiver sensitivity despite an overall link length less than 600 km.

33 Claims, 6 Drawing Sheets

OTHER PUBLICATIONS

G.P. Agrawal, "Nonlinear Fiber Optics", Academic Press, $2^{nd}$. ed., pp. 61–113, (1989).

M. Stern et al., "Self–Phase Modulation and Dispersion in High Data Rate Fiber–Optic Transmission Systems", Journal of Lightwave Technology, vol. 8, No. 7, pp. 1009–1014, (1990).

A. Naka et al., "In–Line Amplifier Transmission Distance Determined by Self–Phase Modulation and Group–Velocity Dispersion", Journal of Lightwave Technology, vol. 12, No. 2, pp. 280–287, (1994).

D.S. Peter et al., "Compression of Pulses Spectrally Broadened by Self–phase Modulation Using a Fiber–grating: a Theoretical Study of the Compression Efficiency", Optics Communication, vol. 112, pp. 59–66, (1994).

A. Naka et al., "Fibre Transmission Distance Determined by Eye Opening Degradation Due to Selfphase Modulation and Group–Velocity Dispersion", Electronics Letters, vol. 28, No. 24, pp. 2221–2223, (1992).

* cited by examiner

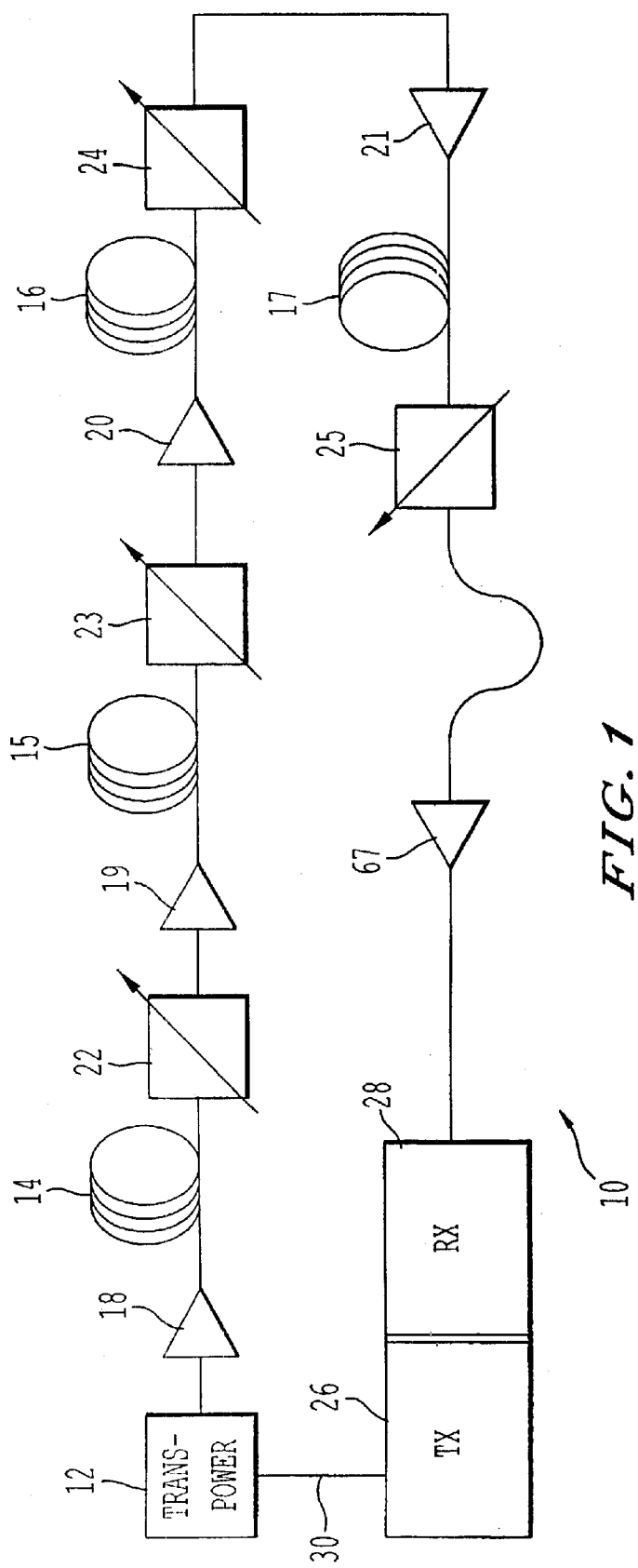

APPARATUS AND METHOD FOR REDUCING SPM/GVD IN OPTICAL SYSTEMS

This application claims the benefit of provisional application 60/088,445 filed on Jun. 5, 1998.

BACKGROUND OF THE INVENTION

The present invention relates generally to an apparatus and method for reducing the non-linear distortion of pulses in a high-power optical communication system, and specifically to an apparatus and method for reducing the distortion produced by the interaction between Self Phase Modulation (SPM) and Group Velocity Dispersion (GVD) in an optical system operating at a high power level.

DISCUSSION OF THE BACKGROUND

The availability of optical amplifiers with increasing output power capacity has expanded the possibilities for high-power optical communication systems. Before the availability of high-power optical amplifiers, optical transmission systems typically employed relatively low power optical sources for initiating signals within a fiber optic system, and relied on a series of repeaters or amplifiers to regenerate or boost the optical signal along its path. High-power optical amplifiers, on the other hand, permit a reduction in the number of repeaters or amplifiers required along a fiber optic link.

Optical signals traveling in a fiber optic system at high power levels, however, are subject to distortions not evident at lower power levels. In conventional low power systems, a single-mode optical fiber behaves as a lossy, dispersive, linear medium. An optical pulse at a low power level attenuates as it passes along the fiber, and becomes symmetrically broadened due to first-order Group Velocity Dispersion (GVD) if the fiber is sufficiently long, e.g. over 600 km. At transmission rates that approach 100 Gb/s, second-order GVD causes the data pulse to spread asymmetrically as well. Nonetheless, typical optical communication at low power levels results in an overall linear response along a standard transmission fiber.

For high-bit rate systems that have an input power in excess of, for example, 5 mW, a single-mode optical fiber begins to exhibit non-linear distortion characteristics caused by Self Phase Modulation (SPM). As an optical pulse propagates in a transmission fiber at high power levels, SPM generates new frequency components that develop a positive frequency chirp. Interaction between SPM and GVD produces non-linear distortion for an optical pulse that is governed by several parameters. These include the optical peak power level launched into the fiber, the sign and the amount of the dispersion of the transmission fiber, and the dispersion map of the total link (i.e. how the signal accumulates dispersion along the link).

Various publications, including Agrawal, *Nonlinear Fiber Optics*, Academic Press, 2nd. ed. (1989), describe theoretically the amount of positive chirp produced by SPM on a Gaussian pulse. The power of such a pulse conforms to the following relationship:

$$P(t) = P_0 \exp\left[-\left(\frac{T}{T_0}\right)^{2m}\right] \quad (1)$$

where $P_0$ is the pulse peak power and $T_0$ is the pulse half-width at 1/e-intensity point. As is readily known in the art, the value m corresponds to the order of the Gaussian pulse. When m=1, the pulse is Gaussian. A larger value of m represents a super-Gaussian pulse, i.e. a sharper Gaussian pulse having shorter rise and fall times. With very high values of m, such as where m>>1, the pulse approaches the shape of a square pulse. With respect to SPM-induced chirp, Agrawal defines it mathematically as follows:

$$\delta\omega(T) = \frac{2mz_{\mathit{eff}}}{T_0 L_{NL}}\left(\frac{T}{T_0}\right)^{2m-1}\exp\left[-\left(\frac{T}{T_0}\right)^{2m}\right] \quad (2)$$

where m changes with the shape of the pulse, the effective fiber length $z_{\mathit{eff}}$ is defined as $z_{\mathit{eff}}=[1-\exp(\alpha z)]/\alpha$, z being the fiber length, the nonlinear length is defined as $L_{NL}=1/(\gamma P_0)$ and $\gamma$ is the fiber nonlinearity coefficient. The maximum spectral broadening of the pulse is given by:

$$\delta\omega_{max} = \frac{2m\Phi_{max}}{T_0}\left(1-\frac{1}{2m}\right)^{1-1/2m}\exp\left[-\left(1-\frac{1}{2m}\right)\right] \quad (3)$$

where $\phi_{max}=\gamma P_0 z_{\mathit{eff}}$. Likewise, GVD causes a chirp on an optical pulse in high-power systems. Agrawal defines the GVD chirp as follows:

$$\delta\omega = \frac{2\mathrm{sgn}(\beta_2)(z/L_D)}{1+(z/L_D)^2}\frac{T}{T_0^2} \quad (4)$$

where $L_D=T_0^2/|\beta_2|$ is the dispersion length for the pulse and $\beta_2$ the group velocity dispersion parameter.

A. Naka et al., "In-line Amplifier Transmission Distance Determined by Self-Phase Modulation and Group-Velocity Dispersion," *Journal of Lightwave Technology*, Vol. 12, No. 2, pp. 280–287 (February 1994) numerically analyze the propagation of intensity-modulated signal in an optical fiber, taking self-phase modulation, group-velocity dispersion, and 2nd-order group-velocity dispersion into account. Transmission distances yelding a prescribed eye-opening penalty are shown to relate to three characteristic lengths: the dispersion length, the 2nd-order dispersion length, and the nonlinear length.

U.S. Pat. No. 5,539,563 (Park) disclose a system and method for simultaneously compensating for chromatic dispersion and self phase modulation in optical fibers. At least one dispersion compensating (DCF) fiber is utilized to compensate for chromatic dispersion of an externally modulated signal carried by at least one single-mode, standard fiber optical cable. The signal power launched in the DCF fiber is controlled such that precise compensation for the SPM effect in the standard fiber can be achieved.

Other references also discuss the impact of SPM and GVD on optical communications with respect to pulse compression devices and techniques. Peter et al., "Compression of Pulses Spectrally Broadened by Self-Phase Modulation Using a Fiber-Grating: A Theoretical Study of the Compression Efficiency," *Optics Communications*, Vol. 112, pp. 59–66 (Nov. 1, 1994), discusses a theoretical analysis of the potential for using short-fiber gratings with constant grating period for the compression of optical pulses spectrally broadened by SPM. For fiber gratings with constant grating period, this paper confirms through theory and simulations that the maximum achievable pulse compression factor is practically independent of the grating parameters and is typically on the order of two.

Stern et al., "Self-Phase Modulation and Dispersion in High Data Rate Fiber-Optic Transmission Systems," *Jour-* nal of Lightwave Technology, Vol. 8, No. 7, pp. 1009–16, (July 1990), describes the limitations caused by the interaction of first and second-order GVD and intensity-dependent SPM. The paper investigates the theoretical transmission limits imposed by these effects for a range of wavelengths around the zero dispersion wavelength $\lambda_0$ for fibers in which polarization dispersion is negligible. The paper finds that operating at wavelengths longer than $\lambda_0$ improves the transmission distance for data rates greater than 50 Gb/s due to the cancellation of first-order dispersion by SPM. Above 100 Gb/s, higher order dispersion limits the transmission distance even at wavelengths equal to or longer than $\lambda_0$. The paper concludes that linear dispersion compensation using a grating-telescope combination can significantly improve system performance for wavelengths where first order dispersion dominates.

These references, however, focus on the performance of relatively smooth Gaussian pulses in optical systems.

Applicant has observed that modulated optical pulses in a link having less than 600 km of optical fiber do not face pulse overlap due to GVD pulse spreading as considered by the literature for very long distances, even at relatively high bit rates of 2.5 Gb/s. Applicant has further identified that the amount of frequency chirping depends heavily on the shape of the pulses, in particular the pulse edges, which in turn depend on the type of transmission equipment used. Moreover, Applicant has discovered that modulated optical pulses from many conventional SDH and SONET-based transmitters are quite different from smooth Gaussian pulses considered by theoretical calculations, but rather have sharp rising and falling edges similar to super-Gaussian pulses. Applicant remarks that pulses with sharp rising and falling edges are normally preferred for optical communications, in order to minimize the effect of phase jitter and improve detection. These pulses, as observed by Applicant, are subject to frequency chirping much more than theoretical Gaussian pulses. Furthermore, Applicant has found that the pulse shape and the degree of sharpness of their rising and falling edges is not the same for different transmitters and depends on the used equipment.

Moreover, Applicant has determined that due to the above frequency chirping the bit error rate (BER) at the receiver for such pulses is influenced by the receiver characteristics, in particular by the type of electric filtering done in the receiver. This makes the optical system characteristics very much dependent on the choice of transmitting and receiving equipment or the degree of matching of the available transmitter and receiver.

U.S. Pat. No. 5,267,073 (Tamburello et al.) discloses adapters for interconnecting fiber lines including optical amplifiers, wherein the transmitters and receivers have different operating parameters (e.g., transmission speed, wavelength and wavelength variation with temperature) from the operating parameters of the optical amplifiers. An adapter group comprises converting means for converting optical signals to electrical signals, a signal laser transmitter, an adjustment module comprising laser piloting means connected to the output of the converting means and adapted to control the signal transmitter by said electrical signals and an optical amplifier coupled to the output of the laser transmitter.

U.S. Pat. No. 5,504,609 (Alexander et al.) discloses an optical remodulator for converting channel wavelengths and a wavelength division multiplexing system. The '609 patent discloses a remodulator that includes an electro-optical converter that produces an electrical signal from a received optical signal having a wavelength $\lambda_{Ti}$. The electrical signal is amplified by transimpedance amplifier, passed through a filter to limit the noise bandwidth and waveshape the signal, and further amplified by a limiting amplifier. Optionally, the remodulator in the '609 patent can include a clock and data recovery circuit for use with high data rate signals. A switch automatically selects high data rate signals and passes them through the clock and data recovery element. The remodulator further includes a laser for producing a carrier signal $\lambda_j$ and an external modulator.

The '609 patent, however, does not address the operation of a communication link at high input power and does not address distortion from the interaction of SPM and GVD. For handling high data rate signals, the '609 patent in FIG. 2 shows an optional path for high data rate signals and low data rate signals. For high data rate signals, the switch directs the electrical signal to the clock and data recovery circuit. This circuitry does not include any device positioned after the clock and data recovery circuit for smoothing sharp edges on pulses produced by the clock and data recovery circuit. The '609 patent does not disclose other techniques for handling high data rate signals.

Applicant has noticed that the SPM-GVD nonlinear interaction can improve or degrade the transmitted signal depending on the values of the parameters in these presented theoretical expressions. In order to understand the influence of SPM and GVD, it is important to evaluate $L_{NL}$, $L_D$ and $z_{eff}$ from the equations above. These parameters identify the length scales over which the nonlinear, the dispersive and the attenuation phenomena become important.

Applicant has determined that a distortion arising due to pulses having sharp rising and falling edges becomes undesirably high if the total length $L_T$ of the optical link is greater than a length $L_M$ given by $$L_M = \frac{L_{NL}}{z_{eff}} z \qquad (5)$$

where z is the (average) length of the span of fiber between consecutive amplifiers, or the span length in case of a single span.

SUMMARY OF THE INVENTION

The present invention is directed to a method and apparatus for reducing non-linear distortion in an optical transmission system caused by the interaction of SPM and GVD that substantially obviates one or more of the limitations and disadvantages of the described prior arrangements. The objects and advantages of the invention will be realized and attained by means of the elements and combinations particularly pointed out in the appended claims. Additional objects and advantages of the invention will be set forth in part in the description which follows, and in part will be obvious from the description, or may be learned by practice of the invention.

In general, the present invention involves techniques for causing the shape of optical pulses that modulate an optical carrier in an optical transmission system to be relatively independent from the shape of those same pulses that are received by equipment that performs the modulation. In particular, a transponder consistent with the present invention includes circuitry for rounding the edges of an optical pulse received from a system transmitter so that the pulses used for modulation resemble Gaussian shaped pulses.

To achieve these and other objects and advantages, and in accordance with the purpose of the invention as embodied and broadly described herein, the invention is, in a first aspect, an optical communication system for reducing nonlinear distortion caused by interaction between Self-Phase Modulation and Group Velocity Dispersion including a transmitter for sending optical pulses at a first wavelength; a transponder coupled to receive and convert the optical pulses to a second wavelength, including an opto-electrical device, means for smoothing rise and fall transitions of electrical pulses received from the opto-electrical device, an electrical amplifier, an optical source and an electro-optic modulator; a plurality of spans linearly coupled to the transponder, each having a length z of optical transmission fiber and at least one optical amplifier; the total length of said plurality of span being greater than $(L_{NL}/z_{eff})z$, wherein $L_{NL}$ is the fiber nonlinear length and $z_{eff}$ is the effective span fiber length; a receiver coupled to the plurality of spans.

According to a second aspect the invention is an optical communication system for reducing non-linear distortion caused by interaction between Self-Phase Modulation and Group Velocity Dispersion including a transmitter for sending optical pulses at a first wavelength; a transponder coupled to receive and convert the optical pulses to a second wavelength, including an opto-electrical device, means for smoothing rise and fall transitions of electrical pulses received from the opto-electrical device, an electrical amplifier, an optical source and an electro-optic modulator; a section of optical transmission fiber having an effective length $z_{eff}$ greater than the fiber nonlinear length $L_{NL}$; a receiver coupled to the fiber section.

In both the above first and second aspect of the invention the means for smoothing the electrical pulses can comprise an electrical attenuator positioned between the opto-electronic device and the electrical amplifier or a low pass filter positioned after the electrical amplifier. In an embodiment, the means for smoothing the electrical pulses comprises a data and clock recovery circuit positioned between the opto-electronic device and the electrical amplifier and a low pass filter positioned after the electrical amplifier.

In another aspect, the invention is a method for reducing nonlinear optical distortion caused by the interaction of Self-Phase Modulation and Group Velocity Dispersion, comprising the steps of: receiving optical pulses from a transmitter and converting the optical pulses to electrical pulses; amplifying the electrical pulses; smoothing edges of rise and fall transitions of the electrical pulses; modulating an optical carrier signal with the electrical pulses; and transmitting the modulated optical carrier signal across a plurality of transmission spans having a cumulative length longer than $L_{NL}/z_{eff}$, wherein $L_{NL}$ is the fiber nonlinear length and $z_{eff}$ is the effective spanfiber length. Preferably, the method further includes the step of compensating for dispersion of the modulated optical carrier signal at a position along the plurality of transmission spans, for example using a chirped fiber grating.

In still another aspect the invention is a transponder for receiving optical pulses at a first wavelength generated by an optical transmitter, modulating an optical carrier with the optical pulses, and alleviating non-linear distortion caused by interaction between Self-Phase Modulation and Group Velocity Dispersion, comprising: a photodiode optically coupled to receive and convert the optical pulses to electrical pulses; an electrical amplifier, operating in a saturation condition, electrically coupled to receive and amplify the electrical pulses; a low-pass filter electrically coupled to receive the electrical pulses from the electrical amplifier, the low-pass filter causing rise and fall times of the electrical pulses to lengthen; an optical source providing an optical carrier at a second wavelength; and an electro-optic modulator positioned to modulate the optical carrier with the electrical pulses from the low-pass filter.

In a further aspect the invention is a transponder for receiving optical pulses at a first wavelength generated by an optical transmitter, modulating an optical carrier with the optical pulses, and alleviating non-linear distortion caused by interaction between Self-Phase Modulation and Group Velocity Dispersion, comprising: a photodiode optically coupled to receive and convert the optical pulses to electrical pulses; an electrical attenuator electrically coupled to receive the electrical pulses from the photodiode; an electrical amplifier, operating in a saturation condition, electrically coupled to receive and amplify the electrical pulses from the electrical attenuator; an optical source providing an optical carrier at a second wavelength; and an electro-optic modulator positioned to modulate the optical carrier with the electrical pulses from the electrical amplifier.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated and constitute a part of this specification, illustrate several embodiments of the invention, and together with the description, serve to explain the principles of the invention.

FIG. 1 is a block diagram of an optical communication system for use with the present invention;

DESCRIPTION OF THE PREFERRED EMBODIMENTS

Figure 2A:
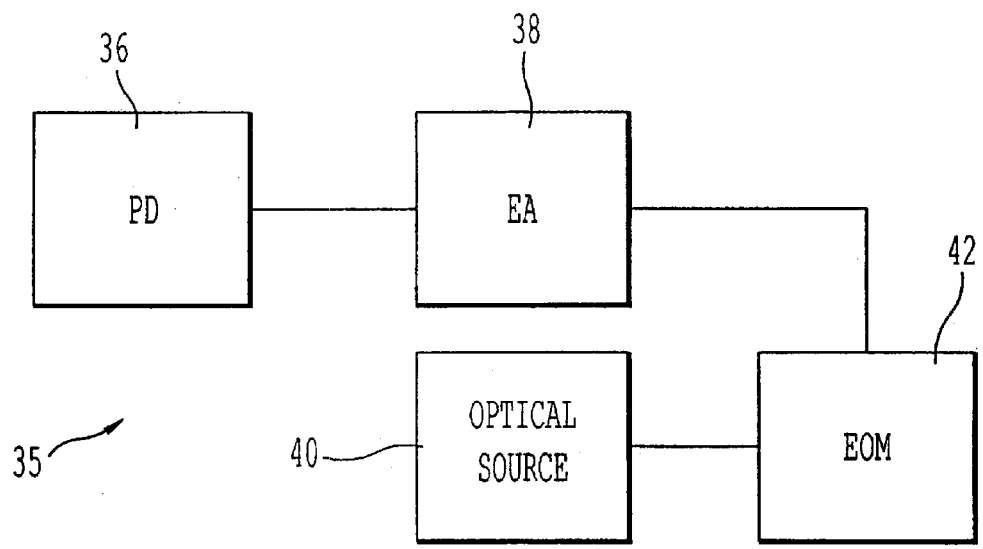
FIG. 2A is a block diagram of a conventional transponder for use in the optical communication system of FIG. 1.

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, an apparatus for reducing distortions caused by the interaction of SPM and GVD comprises a transponder having specific configurations and coupled to a long distance optical telecommunications link. FIG. 1 illustrates a typical telecommunications link for the present invention. A complete communication link, shown generally at 10, generally comprises a transponder 12, various lengths of optical fiber 14–17, a series of amplification devices 18–21. In an experimental setup, as shown in FIG. 1, the link also includes affiliated attenuators 22-25. The variable attenuators 22–25 are used to help simulate a fully installed optical link. Transponder 12 receives optical communication signals from a transmitter such as 26, and attenuator 25 passes optical signals at the end of the communication link to a receiver such as 28. Transmitter 26 and receiver 28 may be part of separate SDH or SONET terminals for a larger optical communication network. In an actual implementation, transmitter 26 and receiver 28, of course, would be located in separate places, as opposed to the illustration of FIG. 1 which shows a setup for experimental purposes.

As is known in the art, a transponder 12 typically operates to translate a wavelength received from transmitter 26 to a new wavelength appropriate for the overall optical link 10. The wavelengths received by transponder 12 may not correspond to a wavelength band acceptable for amplification on the link by amplifiers 18–21. In particular, amplifiers 18–21 may comprise rare-earth-doped fibers, and preferably erbium-doped fibers, which have a defined wavelength band for amplification. The preferred erbium-doped fibers, for instance, have a desirable gain region for wavelengths between about 1525 nm through 1565 nm, although other amplification bands may be available by active fibers doped with erbium and/or other active dopants, such as rare-earth dopants. Consequently, transponder 12 will convert wavelengths received from transmitter 26 via lines 30 to selected wavelengths within the amplification band for fiber amplifiers 18–21.

Referring to FIG. 2A, a conventional transponder 35 for converting received wavelengths comprises a photodiode 36, an electrical amplifier 38, an optical source 40, and an electro-optical modulator 42. Photodiode 36 receives optical signals from transmitter 26 and converts those signals to electrical signals in a known manner. Electrical amplifier 18 boosts the electrical signal from photodiode 36. Typically, electrical amplifier 38 operates in saturation. This saturated condition causes a non-linear response from the amplifier with respect to the input signal that reshapes the electrical signal and clamps its high level. The output from electrical amplifier 38 is fed to electro-optic modulator 42 to modulate an optical carrier signal produced by optical source 40. Optical source, or laser, 40 produces a constant carrier wavelength that may be different from the optical wavelength received by photodiode 36 and corresponds to a wavelength or channel within the amplification band of the fiber amplifiers 18–21. In the experiments described in the following a laser with a wavelength of about 1557 nm was used, although other wavelengths comprised in the amplification band of amplifiers 18–21 may be adopted.

In the arrangement of FIG. 2A, photodiode 36 may receive pulses that have a high bit rate. By high bit rate, it is meant that the bit rate of the pulses occurs at 2.5 Gb/s and above. Also, the equipment upstream from transponder 35, i.e. transmitter 26, may tend to generate optical pulses having short rise and fall times that produce pulses with sharp edges compared with a Gaussian pulse. Moreover, the output power of optical source 40 combined with transmitter power amplifier 18 in FIG. 1 will provide a relatively high power level to the optical signal that leaves the transponder. The term high power refers, for example, to a peak input power at the beginning of the optical link in excess of 14 dBm per channel. Applicant has found that the combination of the high bit rate and high power of optical pulses after the transponder results in detrimental nonlinear effects from the interaction of SPM and GVD that exceed the predictions of the known literature.

Applicant has observed that transponders like the transponder 35 depicted in FIG. 2A do not effectively alter the super-Gaussian shape of input pulses received by photodiode 36 from many SDH and SONET transmitters, such that the shape of the pulse that exits the transponder 35 is dependent on the shape of the pulse that enters transponder 35. Applicant has found that replacing transponder 35 with a transponder that outputs a pulse shape that is somewhat independent from the input pulse shape, i.e. outputs a Gaussian shaped pulse rather than a super-Gaussian shaped pulse, can help to alleviate nonlinear effects caused by the interaction of SPM and GVD.

Figure 2B:
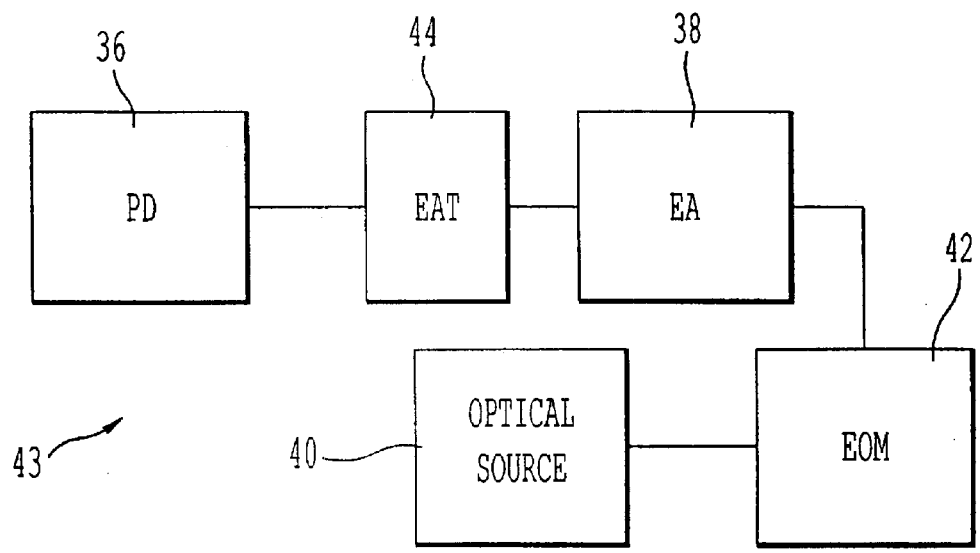
FIG. 2B is a block diagram of a transponder consistent with a first embodiment of the present invention for use in the optical communication system of FIG. 1.

FIG. 2B illustrates transponder 43 consistent with a first embodiment of the present invention. Transponder 43 of FIG. 2B includes photodiode 36, electrical amplifier 38, laser 40, and electro-optic modulator 42 as in the arrangement shown in FIG. 2A. Photodiode 36 can be, e.g., an avalanche photodiode or a PIN-FET device comprising a PIN detector and a FET preamplifier. To help alleviate the SPM/GVD distortion from an optical communication link 10, transponder 43 includes an electrical attenuator 44 positioned between photodiode 36 and electrical amplifier 38. As already mentioned the shape of the pulse is important in affecting non-linear distortion from SPM/GVD interaction. Electrical attenuator 44, by attenuating the electrical signal received by electrical amplifier 38, smoothes the signal sharp-edged pulses. In particular, the attenuator 44 provides a predetermined level of attenuation to the electrical signal received from photodiode 36 such that electrical amplifier 38 does not operate in its typical state of deep saturation. As is readily known in the art, deep saturation occurs when the amplifier's output power is substantially independent from its input power. With attenuator 44 positioned prior to electrical amplifier 38, the electrical signal entering electrical amplifier 38 is attenuated to a power level below that which causes the amplifier 38 to operate in deep saturation. In this condition with the use of attenuator 44, the output power from electrical amplifier 38 is dependent on the input power received from attenuator 44, and may be linearly related to the input power level.

It will be understood that the precise amount of attenuation required to obtain improved response for nonlinear effects depends on the overall characteristics of the communication link 10, such as the amount of rise and fall times for pulses generated by transmitter 26, the type of amplifier 38 used, the amount of amplification performed on the optical pulse when sent through the communication link 10, the pulse rate, etc. In one example for the present invention using model WBA3-4-06G20N manufactured by ERA for limiting amplifier 38, Applicant has observed that attenuator 44 should be set to provide an input voltage of less than 0.5V to the amplifier 38. Typically, such an amplifier is operated in a saturated condition where the input voltage is around 1V. To achieve the electrical input voltage of 0.5V for the amplifier, a high frequency resistive 50 Ω attenuator was used for attenuator 44 to provide 6 dB of attenuation. This attenuation provides a linear, as opposed to saturated, operation for amplifier 38 and provides smoother pulses as an output from amplifier 38 when sharp-edged pulses are received. The results from the use of transponder 43 shown in FIG. 2B in the communication link 10 of FIG. 1 are described below. In general, transponder 43 provides a reduction of chirp produced by SPM.

Figure 2C:
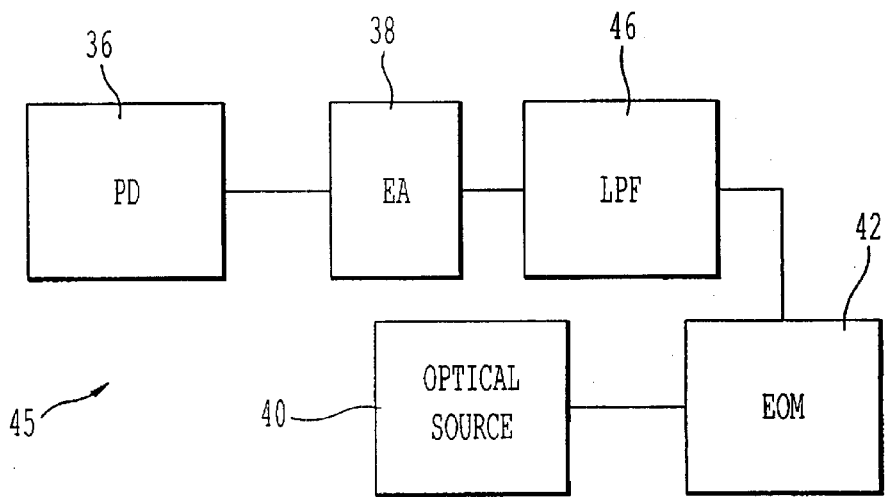
FIG. 2C is a block diagram of a transponder consistent with a second embodiment of the present invention.

FIG. 2C illustrates a transponder 45 consistent with a second embodiment of the present invention. Transponder 45 includes photodiode 36, electrical amplifier 38, laser or optical source 40, and electro-optic modulator 42 similar to transponder 35 of FIG. 2A and transponder 43 of FIG. 2B. As with transponder 43, transponder 45 of the second preferred embodiment receives pulses that have a high bit rate from upstream equipment. Transponder 45, however, includes a low pass filter (LPF) 46 positioned after electrical amplifier 38 rather than an electrical attenuator 44 positioned between photodiode 36 and electrical amplifier 38. LPF 46 reduces the bandwidth of the electrical signal received from amplifier 38. Preferably for a transmission rate of 2488 Mb/s, LPF 46 is a fourth-order Bessel-Thompson filter having a bandwidth of 1.866 GHz, which is commercially available, for example, from Anritsu, having Model No. MA1619. By reducing the bandwidth of the electrical signal received from amplifier 38, LPF 46 helps to lengthen the rise and fall times of the edges of the signal pulses used by electro-optic modulator 42 to modulate the optical carrier from laser 40. As with the embodiment of FIG. 2B, the smoothing of the pulse in the arrangement of FIG. 2C helps to reduce chirp produced by SPM in the overall communication link when the optical pulses from the transponder are elevated to a high input power and operate at high bit rates.

Figure 2D:
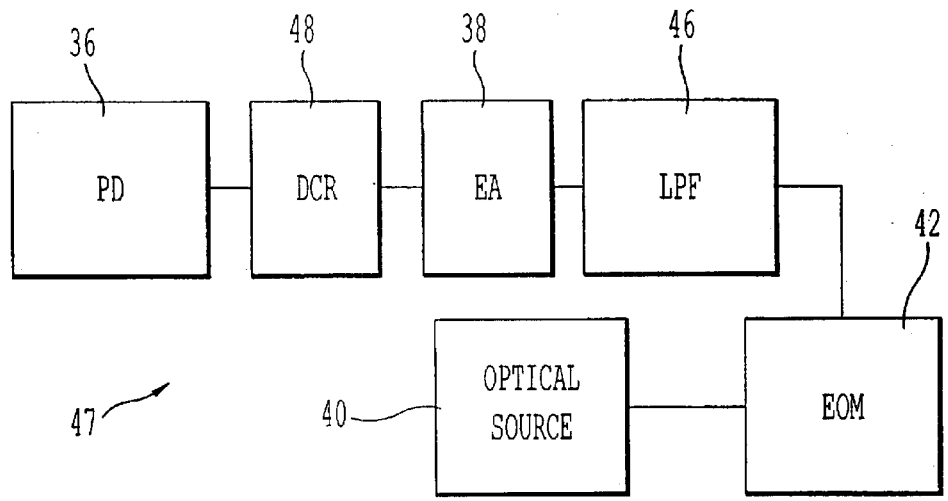
FIG. 2D is a block diagram of a transponder consistent with a third embodiment of the present invention.
Figure 2E:
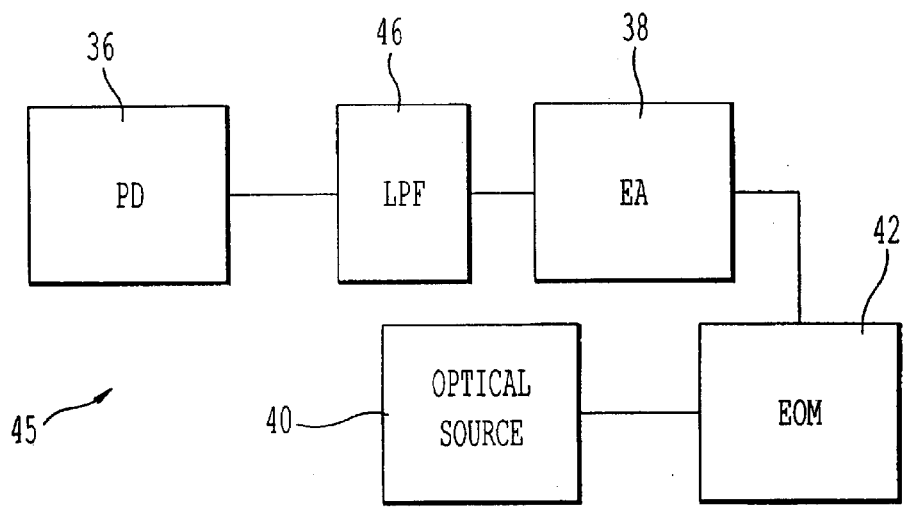
FIG. 2E is a block diagram of a transponder consistent with a modification of the second embodiment of the present invention.

Alternatively, as shown in FIG. 2E, LPF 46 can be positioned before amplifier 38 rather than after it to provide a narrowing of the pulse bandwidth. This positioning may cause the amplifier 38 to move from a saturated to a linear mode of operation. It is preferred, however, to locate LPF 46 after amplifier 38 so that amplifier 38 can maintain its operation in a saturated state. In this way, the output signal from amplifier 38 can remain independent from the input signal.

FIG. 2D illustrates a transponder 47 consistent with a third embodiment of the present invention. Transponder 47 of FIG. 2D includes photodiode 36, electrical amplifier 38, low pass filter 46, laser 40, and electro-optic modulator 42, similar to transponder 45 of FIG. 2C. As with the transponders 43 and 45 of FIGS. 2B and 2C, the third preferred embodiment receives super-Gaussian pulses that have a high bit rate from upstream equipment, which when combined with a high input power to the optical link from the transponder and a booster amplifier can lead to non-linear distortion due to the interaction of SPM and GVD. Transponder 47 of FIG. 2D includes a data and clock recovery circuit (DCR) 48 positioned between photodiode 36 and electrical amplifier 38. DCR 48 adds to the function of smoothing the sharp-edged input pulses by reducing jitter of optical pulses received from photodiode 36 and making the signal that drives electrical amplifier 38 practically independent from the shape of the optical signal coming from transmitter 26. Instead, the signal that drives the electrical amplifier 38 then depends only on the shape of the pulse produced by DCR 48. Preferably, DCR 48 is an AT&T device having Model No. LG1600FXH, and operating at 2488 Mb/s.

DCR 48, however, still produces pulses that have relatively short rise and fall times, i.e. pulses with sharp edges. LPF 46, which is located downstream from DCR 48, receives the sharp-edged pulses from DCR 48 and narrows their bandwidth, which effectively rounds the edges to the beginning and end of the pulses. As with the transponder 45 in FIG. 2C, the LPF 46 in transponder 47 in FIG. 2D is preferably positioned after electrical amplifier 38 rather than before it. In this manner, LPF 46 can smooth the edges of the electrical pulses in transponder 47 without causing the amplifier 38 to operate in a linear condition as opposed to a saturated condition. With LPF 46 located between amplifier 38 and electro-optic modulator 42, DCR 48 can regenerate the received pulses and amplifier 38 can operate in saturation, so that the pulses received by LPF 46 are independent from the received pulses and elevated in power. LPF 46 then narrows their bandwidth to transform the pulses from a super-Gaussian shape to a Gaussian shape. As with the previously described transponders 43 and 45, electro-optic modulator 42 which may be a Mach-Zehnder modulator, an electroabsorption modulator or similar device, will modulate the optical carrier signal from laser diode 40 with the transformed pulses.

It should be understood that various combinations of transponders 43, 45, and 47 may be employed in an optical communication system having a high bit rate and providing modulated pulses at a high power level to help alleviate non-linear distortion caused by the interaction of SPM and GVD. For example, a transponder could be used that has an electrical amplifier 38 situated between an attenuator 44 and an LPF 46. Other combinations of the described components will be apparent to one of ordinary skill in the art and are contemplated by the present invention.

Returning to FIG. 1, the apparatus for experimental testing using the transponders of the first three embodiments will now be described. As mentioned, the optical communications link includes a series of long distance communication fibers 14–17. Each of these fibers comprises a single mode optical fiber having a zero dispersion around 1300 nm. The total transmission fiber had a length of about 509 km, where fiber 14 was 129 km, fiber 15 was 128 km, fiber 16 was 125 km, and fiber 17 was 127 km. The carrier wavelength, i.e., the wavelength of laser 40 in transponder 12, was 1557 nm. Amplifiers 18–21 comprised erbium-doped fiber amplifiers operating at a pump wavelength of 980 nm. Amplifier 18 was model TPA/E-SW, manufactured by Applicant, and was operated as a transmitter power amplifier, while amplifiers 19–21 were model OLA/E-F, also manufactured by Applicant, and functioned as optical line amplifiers. The average output power of the amplifiers was 13.5 dBm, corresponding to a peak power of about 16.5 dBm. Transmission fibers 14–17 also added attenuation to the transmission link. Specifically, fibers 14–17 had a zero dispersion wavelength of around 1300 nm and attenuations of 25.4 dB, 26.7 dB, 27.1 dB, and 24.9 dB, respectively. Also, attenuators 22–25 added adjustable attenuation to the optical link 10. These attenuators permitted a change in the attenuation of the span. The optical amplifiers each included filters (not shown) for removing amplified spontaneous emission and for minimizing other noise within the amplifiers. An optical preamplifier 67 can be arranged before receiver 28 to enhance sensitivity. Preamplifier 67, however, was not present in an embodiment tested by Applicant. Optical preamplifier 67 can be for example model RPA/B-F manufactured by Applicant.

For a standard optical fiber and peak power for an optical pulse of $P_0$=16 dBm, the nonlinear length $L_{NL}$ is about 14 km. For m=3, a bit rate of 2.5 Gb/s and a standard fiber with a fiber loss α=0.2 dB/km and $\beta_2$=−20 ps$^2$/km, the dispersion length $L_D$ is 1750 km. For a standard fiber with a fiber loss α=0.2 dB/km and an average span length (between optical amplifiers) z=126.5 km, $z_{eff}$ is 21.6 km.

Based on the above values, (5) gives $L_M$=82 km. As the total length of the link $L_T$ is in this case 509 km, the condition for pulse distortion $L_T$>$L_M$ is verified.

Figure 3:
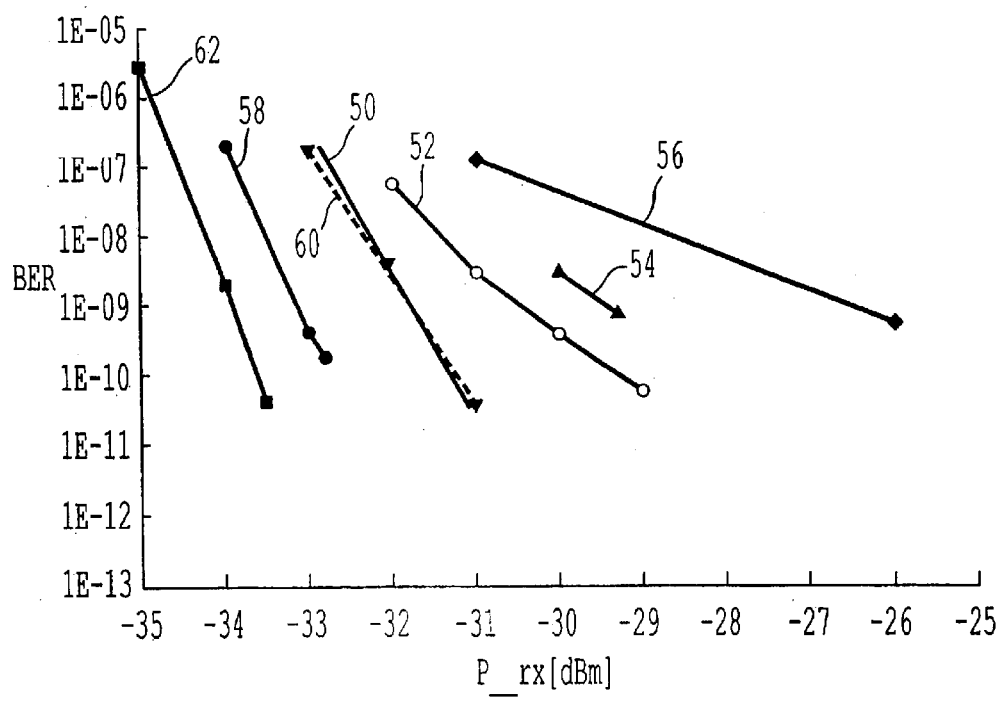
FIG. 3 is a chart of test results showing bit error rate versus received power for several arrangements of the present invention in the optical communication system of FIG. 1.

FIG. 3 illustrates the bit error rate (BER) versus the received power for the optical link shown in FIG. 1 under various conditions. Line 50 shows the performance of the system when the transmitter 26 and the receiver 28 are looped together in a back-to-back configuration. Line 52 shows the BER versus received power for the case where the spans in FIG. 1 had an attenuation of 38 dB. Line 54 shows the results from the same setup with 41 dB of attenuation, and line 56 shows the results with 32 dB. Each of the tests shown for lines 52–56 used the standard transponder 35 of FIG. 2A.

FIG. 3 also shows the results of BER versus received power when transponder 47 of FIG. 2D was used in place of transponder 35. Line 58 shows the results using transponder 47 with a span attenuation of 38 dB. Similarly, line 60 shows BER versus received power using transponder 47 with a span attenuation of 41 dB, and line 62 illustrates the performance of the same setup with a span attenuation of 32 dB. A comparison of these results shows that transponder 47 provides a superior sensitivity, i.e. minimum receiver power in order to achieve a fixed BER. Transponders 43 and 45 can provide similar results.

As is commonly known in the art, it is possible to transmit an externally modulated signal without any significant dispersion penalty along a length of fiber that is less than about 600 km. Nevertheless, for high input power, SPM may cause chirping of the pulses that leads to a degradation of the signal despite the relatively short fiber length.

Applicant has found that the insertion of a dispersion compensating device, such as a segment of dispersion compensating fiber or a chirped fiber Bragg grating, along a fiber optic link that has less than about 600 km of fiber and operates at high input power and high bit rates, helps to alleviate non-linear distortion caused by the interaction of SPM and GVD.

Figure 4:
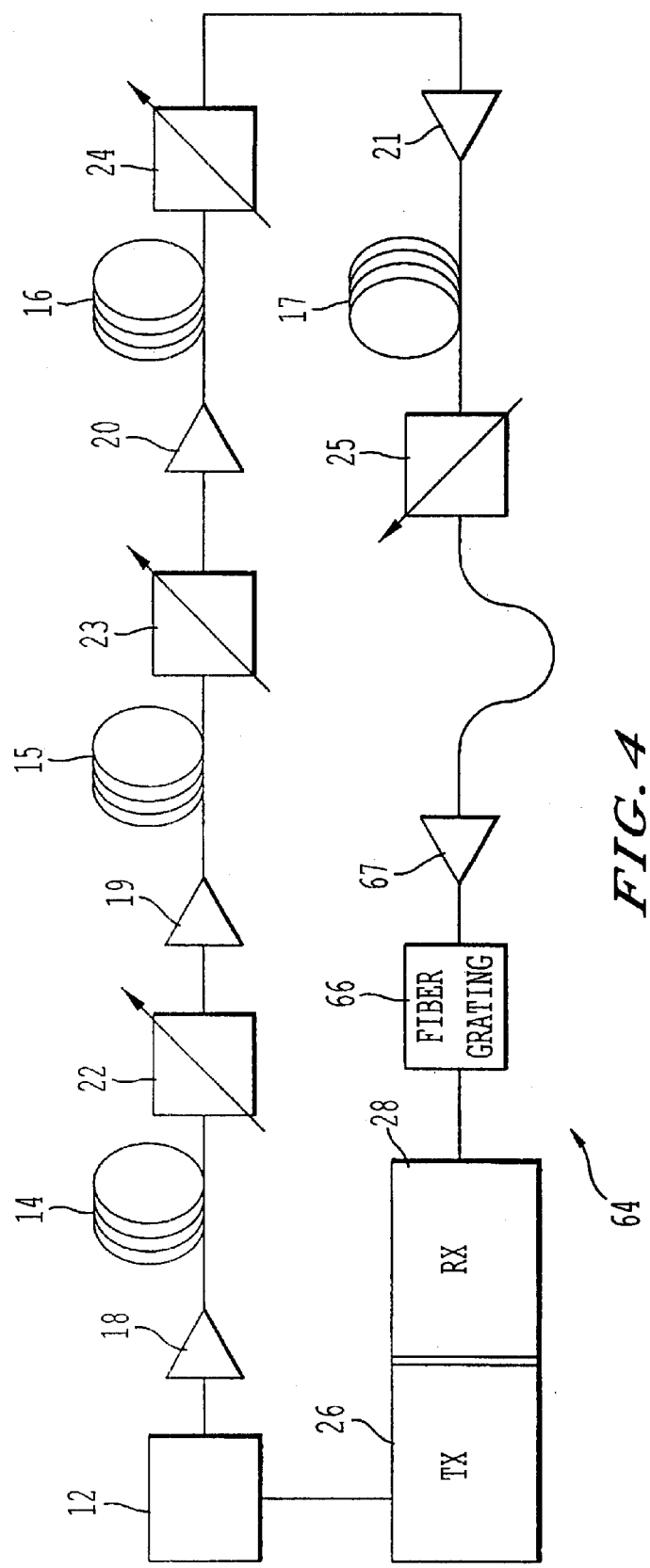
FIG. 4 is a block diagram of an optical communication system according to fourth embodiment of the present invention.

Accordingly, FIG. 4 illustrates another optical communication link 64 for reducing effects from the interaction of SPM and GVD consistent with the present invention. The optical link 64 contains essentially the same components as does optical link 10 of FIG. 1. That is, the link 64 has a transmitter 26 that provides optical pulse signals to a transponder 12, and optical amplifiers 18–21, transmission optical fiber 14–17, and attenuators 22–25 that pass the optical pulses across a distance to receiver 28. The transponder 12 may be a conventional transponder 35 as shown in FIG. 2A or may be an enhanced transponder such as 43, 45, or 47 shown in FIGS. 2B–D. Optical link 64, however, includes a dispersion compensating device, which is preferably grating 66, positioned preferably before the receiver 28. The grating may comprise a Bragg grating filter or a similar device having a chirping and a passband set according to the characteristics of the optical pulses used in the link. While the grating 66 may be placed at several locations in the optical link 64, the grating 66 preferably is positioned before receiver 28 for optimal performance. Although not used in an embodiment tested by Applicant, an optical preamplifier 67 may be arranged before grating 66 to enhance sensitivity. Optical preamplifier 67 can be for example model RPA/B-F manufactured by Applicant. According to another embodiment, not shown, grating 66 can be integrated with optical preamplifier 67, and act also as a band pass-filter. According to a further, different embodiment, a dispersion compensating fiber can be used instead of grating 66.

Figure 5:
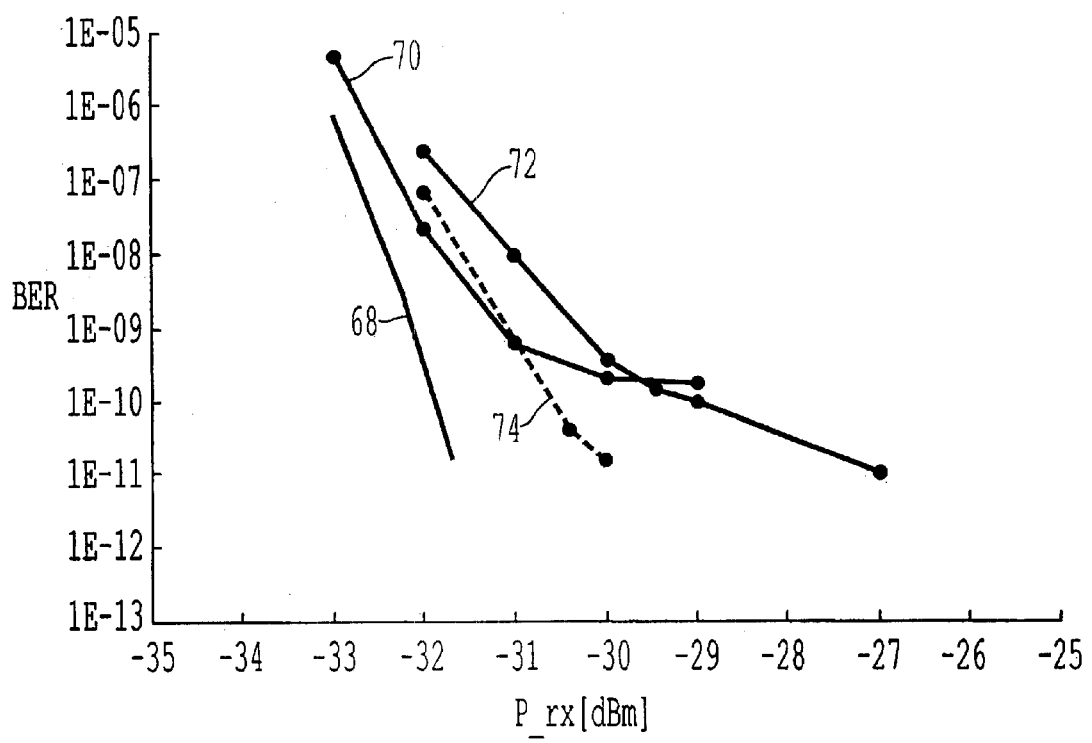
FIG. 5 is a chart of test results showing bit error rate versus received power for several arrangements of the present invention in the optical communication system of FIG. 4.

FIG. 5 illustrates the bit error rate (BER) versus the received power for the optical link shown in FIG. 4 under various conditions. Again, as with the tests for optical link 10, line 68 shows the performance of the system when the transmitter 26 and the receiver 28 of optical link 64 are looped together in a back-to-back configuration. Line 70 shows the BER versus received power for the case where the spans in FIG. 1 had an attenuation of 38 dB but where no dispersion compensation was used. In this circumstance, transponder 12 had an electrical attenuator 44 of 6 dB before the electrical amplifier 38 that drives the electro-optic modulator 42, such that its configuration corresponded with transponder 43 of FIG. 2B. Line 70 shows a floor in BER for received power value greater than about −31 dBm. This corresponds to a BER that does not decrease below a value between $10^{-10}$ and $10^{-9}$ even with increasing received power. Line 72 shows the results from the same setup with a fiber grating 66 positioned between transponder 12 and booster amplifier 18 of the optical link 64. The grating had 7 nm of bandwidth and compensated for a dispersion of 1700 ps/nm (corresponding to the dispersion of around 100 km of standard fiber). Also line 72 shows a floor in BER, although less pronounced that that of line 70. Line 74 shows the results from the same setup as line 70, except where a fiber grating 66 was positioned before the receiver 28 in optical link 64. It can be seen that an improved noise performance is achieved, unaffected by a floor in the BER curve.

Although the above description and experiments relate to optical systems having a plurality of spans, Applicant has determined that high power single span optical system, such as those used for unrepeatered submarine links, can also benefit from the invention if the fiber span effective length $z_{\mathit{eff}}$ exceeds the nonlinear length $L_{\mathit{NL}}$, whereby pulse distortion may occur. Effects of SPM/GVD can be counteracted, for such systems as well, by use of a transponder as above described with reference to FIGS. 2b–2d and/or by dispersion compensation as described with reference to FIG. 4.

The so far described embodiments relate to single channel transmission. Also multichannel or WDM transmission can benefit from the invention if high power optical amplifiers are available to boost the peak power of individual channels beyond a critical value that may cause pulse distortion due to SPM/GVD interaction. This critical value depends on the characteristics of the optical link according to the above description.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical communication system for reducing non-linear distortion caused by interaction between Self-Phase Modulation and Group Velocity Dispersion, comprising:

a transmitter for sending optical pulses at a first wavelength;

a transponder coupled to receive and convert the optical pulses to a second wavelength, including an opto-electrical device, means for smoothing rise and fall transitions of electrical pulses received from the opto-electrical device, an electrical amplifier, an optical source and an electro-optic modulator;

a plurality of spans linearly coupled to the transponder, each having a length z of optical transmission fiber and at least one optical amplifier; the total length of said plurality of span being greater than $(L_{NL}/z_{eff})z$, wherein $L_{NL}$ is the fiber nonlinear length and $z_{eff}$ is the effective span fiber length, a receiver coupled to the plurality of spans.

2. The optical communication system of claim 1, wherein the means for smoothing the electrical pulses comprises an electrical attenuator positioned between the opto-electronic device and the electrical amplifier.

3. The optical communication system of claim 1, wherein the means for smoothing the electrical pulses comprises a low pass filter positioned between the electrical amplifier and the electro-optical modulator.

4. The optical communication system of claim 3, wherein the means for smoothing the electrical pulses further comprises a data and clock recovery circuit positioned between the opto-electronic device and the electrical amplifier.

5. The optical communication system of claim 1, wherein each of the plurality of spans exhibits approximately an identical amount of optical attenuation.

6. The optical communication system of claim 1, wherein the transmitter sends pulses at a rate of at least 2.5 Gb/s.

7. The optical communication system of claim 1, further comprising a dispersion compensating device positioned between the plurality of spans and the receiver, wherein the plurality of lengths of optical transmission fiber cumulatively does not exceed 600 Km.

8. The optical communication system of claim 1, wherein the second wavelength is the same said the first wavelength.

9. An optical communication system for reducing non-linear distortion caused by interaction between Self-Phase Modulation and Group Velocity Dispersion, comprising:

a transmitter for sending optical pulses at a first wavelength;

a transponder coupled to receive and convert the optical pulses to a second wavelength, including an opto-electrical device, means for smoothing rise and fall transitions of electrical pulses received from the opto-electrical device, an electrical amplifier, an optical source and an electro-optic modulator;

a section of optical transmission fiber having an effective length $z_{eff}$ greater than the fiber nonlinear length $L_{NL}$, a receiver coupled to the fiber section.

10. The optical communication system of claim 9, wherein the second wavelength is the same and the first wavelength.

11. A method for reducing nonlinear optical distortion caused by the interaction of Self-Phase Modulation and Group Velocity Dispersion, comprising the steps of:

receiving optical pulses from a transmitter and converting the optical pulses to electrical pulses;

amplifying the electrical pulses;

smoothing edges of rise and fall transitions of the electrical pulses;

modulating an optical carrier signal with the electrical pulses; and transmitting the modulated optical carrier signal across a plurality of transmission spans having a cumulative length longer than $L_{NL}/z_{eff}$, wherein $L_{NL}$ is the fiber nonlinear length and $z_{eff}$ is the effective span fiber length.

12. The method of claim 11, further comprising the step of narrowing a bandwidth of the electrical pulses after amplifying the electrical pulses.

13. The method of claim 11, further comprising the step of compensating for dispersion of the modulated optical carrier signal at a position along the plurality of transmission spans.

14. The method of claim 13, wherein the step of compensating occurs after the step of transmitting.

15. The optical communication system of claim 11, wherein the second wavelength is the same as the first wavelength.

16. A transponder for receiving optical pulses at a first wavelength generated by an optical transmitter, modulating an optical carrier with the optical pulses, and alleviating non-linear distortion caused by interaction between Self-Phase Modulation and Group Velocity Dispersion, comprising:

a photodiode optically coupled to receive and convert the optical pulses to electrical pulses;

an electrical amplifier, operating in a saturation condition, electrically coupled to receive and amplify the electrical pulses;

a low-pass filter electrically coupled to receive the electrical pulses from the electrical amplifier, the low-pass filter causing rise and fall times of the electrical pulses to lengthen;

an optical source providing an optical carrier at a second wavelength; and an electro-optic modulator positioned to modulate the optical carrier with the electrical pulses from the low-pass filter.

17. The transponder according to claim 15, further comprising a data and clock recovery circuit positioned between the photodiode and the electrical amplifier.

18. The optical communication system of claim 16, wherein the second wavelength is the same as the first wavelength.

19. The transponder according to claim 16, wherein the low-pass filter is a fourth order Bessel-Thompson filter.

20. A transponder for receiving optical pulses at a first wavelength generated by an optical transmitter, modulating an optical carrier with the optical pulses, and alleviating non-linear distortion caused by interaction between Self-Phase Modulation and Group Velocity Dispersion, comprising:

a photodiode optically coupled to receive and convert the optical pulses to electrical pulses;

an electrical attenuator electrically coupled to receive the electrical pulses from the photodiode;

an electrical amplifier, operating in a saturation condition, electrically coupled to receive and amplify the electrical pulses from the electrical attenuator;

an optical source providing an optical carrier at a second wavelength; and an electro-optic modulator positioned to modulate the optical carrier with the electrical pulses from the electrical amplifier.

21. The optical communication system of claim 20, wherein the second wavelength is the same as the first wavelength.

22. The transponder according to claim 20, wherein the electrical attenuator outputs a signal of less than 0 .5V.

23. The transponder according to claim 20, wherein the electrical attenuator comprises a 50 Ω resistor.

24. A transponder for receiving optical pulses at a first wavelength generated by an optical transmitter, modulating an optical carrier with the optical pulses, and alleviating non-linear distortion caused by interaction between Self-Phase Modulation and Group Velocity Dispersion, comprising:

a photodiode optically coupled to receive and convert the optical pulses to electrical pulses;

an electrical attenuator electrically coupled to receive the electrical pulses from the photodiode;

an electrical amplifier, operating in a saturation condition, electrically coupled to receive and amplify the electrical pulses from the electrical attenuator, wherein the electrical attenuator attenuates the electrical pulses from the photodiode to a predetermined level to prevent the electrical amplifier from operating in deep saturation;

an optical source providing an optical carrier at a second wavelength; and an electro-optic modulator positioned to modulate the optical carrier with the electrical pulses from the electrical amplifier.

25. The optical communication system of claim 24, wherein the second wavelength is the same as the first wavelength.

26. A transponder for receiving optical pulses at a first wavelength generated by an optical transmitter, modulating an optical carrier with the optical pulses, and alleviating non-linear distortion caused by interaction between Self-Phase Modulation and Group Veloicity Dispersion, comprising:

a photodiode optically coupled to receive the electrical pulses to electrical pulses;

a low-pass filter electrically coupled to receive the electrical pulses from the photodiode, the low-pass filter causing rise and fall times of the electrical pulses to lengthen;

an electrical amplifier, electrically coupled to receive and amplify the electrical pulses from the low-pass filter;

an optical source providing an optical carrier at a second wavelength; and an electro-optic modulator positioned to modulate the optical carrier with the electrical pulses from the low-pass filter, 27. The transponder according to claim 26, further comprising a data and clock recovery circuit positioned between the photodiode and the electrical amplifier.

28. The transponder according to claim 26, wherein the low-pass filter is a fourth order Bessel-Thompson filter.

29. The optical communication system of claim 26, wherein the second wavelength is the same as the first wavelength.

30. A transponder for receiving optical pulses at a first wavelength generated by an optical transmitter, modulating an optical carrier with the optical pulses, and alleviating non-linear distortion caused by interaction between Self-Phase Modulation and Group Velocity Dispersion, comprising:

a photodiode optically coupled to receive and convert the optical pulses to electrical pulses;

an electrical attenuator electrically coupled to receive the electrical pulses from the photodiode;

an electrical amplifier electrically coupled to receive and amplify the electrical pulses from the electrical attenuator;

an optical source providing an optical carrier at a second wavelength; and an electro-optic modulator positioned to modulate the optical carrier with the electrical pulses from the electrical amplifier.

31. The optical communication system of claim 30, wherein the second wavelength is the same as the first wavelength.

32. The transponder according to claim 30, wherein the electrical attenuator outputs a signal of less than 0 .5V.

33. The transponder according to claim 30, wherein the electrical attenuator comprises a 50 Ω resistor.

* * * * *

UNITED STATES PATENT AND TRADEMARK OFFICE
CERTIFICATE OF CORRECTION

PATENT NO.    : 6,583,905 B1
DATED         : June 24, 2003
INVENTOR(S)   : Gainluca Bonato et al.

It is certified that error appears in the above-identified patent and that said Letters Patent is hereby corrected as shown below:

Column 13,
Line 27, after "same" delete "said" and insert -- as --.
Line 44, after "same" delete "and" and insert -- as --.

Column 14,
Line 27, after "claim" delete "15" and insert -- 16 --.

Column 15,
Line 25, after "receive" insert -- and convert the optical pulses --.
Line 37, delete "pass filter," and insert -- pass filter. --

Signed and Sealed this

Sixteenth Day of March, 2004

JON W. DUDAS
*Acting Director of the United States Patent and Trademark Office*